United States Patent Office 3,493,632
Patented Feb. 3, 1970

3,493,632
PROCESS FOR THE PREPARATION OF BLOCK COPOLYMERS OF POLYAMIDE AND POLYESTER AND OF FIBERS THEREFROM
Kaoru Okazaki, Asaharu Nakagawa, Yuzaburo Nakayama, and Kenji Sugii, Nagoya, Japan, assignors to Toyo Rayon Kabushiki Kaisha, Tokyo, Japan, a corporation of Japan
No Drawing. Filed May 15, 1967, Ser. No. 638,651
Claims priority, application Japan, May 18, 1966, 41/31,144; May 24, 1966, 41/32,666
Int. Cl. C08g 20/30
U.S. Cl. 260—857  26 Claims

ABSTRACT OF THE DISCLOSURE

A process for the preparation of block copolymers of polyamide and polyester which comprises heating a solid mixture of polyamide and polyester to a temperature within the range above the second order transition point of the mixture component having the highest second order transition point and below the melting point of the mixture component having the lowest melting point, and whereby reacting the polyamide and the polyester at solid phase.

---

This invention relates to a process for the preparation of block copolymers of polyamide and polyester (hereinafter may be briefly referred to as block polyesteramide) of high quality at high yields, and also a process for the preparation of fibers using the block copolymer.

More particularly the invention relates to a process for the preparation of a block copolymer of polyamide and polyester which comprises heating a solid mixture consisting of at least one polyamide and at least one polyester to a temperature above the second order transition point of the mixture component having the highest second order transition point but below the melting point of the mixture component having the lowest melting point, and whereby reacting the polyamide or polyamides with the polyester or polyesters at substantially solid phase, and a process for the preparation of high quality fibers from thus obtained block polyesteramide.

Polyamide has excellent tenacity, durability and dyeability, but the fibers therefrom have some defects due to low initial modulus and poor stiffness. Whereas, fibers obtained from polyester quite advantageously have high initial modulus and stiffness but their dyeability is poor.

For this reason attempts have been made to provide a polymer composition which will form fibers having concurrently the advantages of polyamide and polyester and which are free from the deficiencies mentioned. One typical known attempt proposed in the art comprises preparation of a blend in which polyamide and polyester are present as each independent phases with no mutual reaction, and melt-spinning of the same. However the process is subject to a series drawback of poor melt-spinnability due to the tendency occurring during the melt-spinning that the polyamide and polyester phases in the blend can no more maintain the initial dispersed state but each polymer separately draws together. For instance, an attempt to melt-spin such a blend containing 30–70% of polyester encounters a fatal drawback of filament breakages during the spinning, and therefore melt-spinning of such a blend is practically impossible. Of course it neither is expectable to obtain filaments of satisfactory quality from such an attempt. Furthermore, even when the polyester content of the blend is within the melt-spinnable range, the filaments obtained in most cases have objectionable knots, and filaments of satisfactory quality are obtainable under very strict control substantially unfit for industrial scale production.

The afore-described inconveniences are chiefly attributable to the incompatibleness between polyamide and polyester, and when polyamide and polyester are blend-spun, they fail to maintain the initial dispersed state, and therefore there is no simple cure for them at the present level of spinning techniques.

Other attempts include preparation of polymer having amide linkage and ester linkage in its polymer chain.

One of the methods within that category gives random polyesteramide, and another recently proposed method provides block polyesteramide.

However the former random polyesteramide does not possess the advantageous properties inherent in polyamide and polyester contrary to the expectation to provide improved filaments. The polyesteramide has such deficiencies as low melting point and poor melt-spinnability. Again the filaments obtained therefrom show excessively high percent shrinkage in boiling water and occasionally more than negligible degree of coloration, and therefore are not practical.

Whereas, the only one known method for producing the latter block polyesteramide comprises heating of molten blend of polyamide and polyester for a considerably long period such as 30–90 minutes. To wit, the method provides block polyesteramide by reacting the end groups of polyamide with those of polyester in molten state. However the method is deficient in that wherein a highly objectionable esteramide interchange reaction, so-called equilibrium reaction, takes place as the side effect simultaneously with, and at about the same rate as of, the desired main reaction between the end groups. And, the so-called block polyesteramide obtained by the method is in substance random polyesteramide or close thereto and not the desired block polyesteramide, as demonstrated in the later appearing control.

One possible means for preventing the formation of such random polymer in the block polyesteramide-forming reaction will be shortening of the heating time of the polyamide/polyester blend. However in such a case neither the desired block polyesteramide is obtainable because the reaction between the end groups does not sufficiently progress.

Still another objectionable phenomenon in the above-described method is that, because the polyamide/polyester blend is exposed to heat in molten state for considerably a long period, thermal decomposition takes place. Consequently the resultant product is so heavily colored that its decoloration is by no means easy. Thus the product neither is satisfactory for practical use.

We engaged in an extensive research aiming at the provision of a process free from many of the aforementioned deficiencies of known arts, and as the result completed the subject invention. To wit, the block polyesteramide of the invention concurrently possesses the advantages inherent in polyamide such as high tenacity, high durability and good dyeability, and those inherent in polyester such as high initial modulus. And, the filaments obtained by melt-spinning of the block polyesteramide have may advantages not possessed by conventional synthetic fibers and very high practical value. Again the melt-spinning of the block polyesteramide of the invention is well operable at any copolymerization ratio of polyamide component and polyester component, without the inconveniences described as to the known method.

Heretofore, no industrially satisfactory process for the preparation of block polyesteramide as of the subject invention having the aforesaid excellent properties is known. Accordingly, therefore:

The object of the invention is to provide block polyesteramide having said excellent properties from polyamide and polyester.

A further object of the invention is to provide a process for industrially advantageous and easy provision of such block polyesteramide.

A still further object of the invention is to provide a process for making high quality filaments from the said block polyesteramide.

The above objects of the invention can be accomplished by heating a solid mixture composed of at least one polyamide and at least one polyester to a temperature above the second order transition point of the mixture component having the highest second order transition point and below the melting point of the mixture component having the lowest melting point, and whereby reacting the polyamide or polyamides with the polyester or polyesters at substantially solid phase. Thus the reaction of polyamide and polyester components in the invention is achieved, not in the molten state alike the known method, but at substantially solid phase. It is necessary, in the solid phase reaction of the solid mixture of the polyamide and polyester components, to impart to the polymers a micro-level flowability by heating, in order to bring about the reaction between the end groups. Furthermore, for the advantageous production of good block polyesteramide by the reaction, the heating temperature must be within the range above the second order transition point of the polymer having that of the highest among the mixture components, and below the melting point of the polymer having that of the lowest.

Whereas, there is also a case in which, when a mixture composed of three or more of the polyamide and polyester components is heated to a temperature above the melting point of the component having the lowest melting point, the solid phase reaction of the invention still substantially advantageously progresses due to the low content of the said component. In such a case, the temperature below the second lowest melting point possessed by the component of substantial content is selected as the upper limit of the reaction temperature. For example, in case an aliphatic polyester such as polyethylene adipate and an aromatic polyester such as polyethylene terephthalate are used as the polyester component and polycapramide is used as the polyamide component, if the polyethylene adipate content is below 3 wt. percent to the total amount of the polymers, the solid phase reaction substantially progresses at 200° C., a temperature higher than the melting point of polyethylene adipate. However, when a mixture of increased polyethylene adipate content is heated at 200° C., the reaction progresses at semi-molten phase rather than solid phase, and the desired block polyesteramide of the invention cannot be obtained.

Thus in accordance with the invention it is sufficient so far as the reaction progresses at substantially solid phase, and the case as described in the above is also within the scope of the invention.

As the result of the reaction of the invention as above, reaction between the end groups of the polymers predominantly takes place, and good block polyesteramide is obtained. In accordance with the subject process objectionable side reactions accompanying known methods such as ester-amide interchange reaction and random copolymerization do not substantially take place because it is performed at solid phase, and if such do take place, it is at no more than negligibly minor ratio.

As aforesaid, in accordance with the subject process, filaments from the block polyesteramide having high tenacity, high durability, good dyeability, high initial modulus and high stiffness can be obtained with industrial advantage.

The polyamides useful for the invention are those obtained from lactams, amino acids and nylon salts of diamines and dibasic acids. The lactams are those represented by the general formula

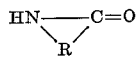

(in which R is a divalent hydrocarbon radical of no less than 4 carbon atoms) such as pyrrolidone, piperidone, caprolactam, enantholactam, capryl lactam and lauryl lactam.

Also the amino acids can be expressed by the general formula $H_2N-R-COOH$ (in which R is a divalent hydrocarbon radical of no less than 2 carbon atoms) and include, for example, aliphatic amino acids such as ε-aminocaproic acid, ω-aminoenanthic acid and the like; aromatic amino acids such as p-aminobenzoic acid and the like; and alicyclic amino acids such as 4-(aminomethyl) cyclohexylcarboxylic acid and the like.

As the diamines, the compounds expressed by the general formula $H_2N-R-NH_2$ (in which R is a divalent hydrocarbon radical of no less than 2 carbon atoms) specific examples include aliphatic diamines such as ethylenediamine, hexamethylenediamine and the like; aromatic diamines such as phenylenediamine, tolylenediamine, xylilenediamine and the like; and alicyclic diamines such as di(p-aminocyclohexyl)methane. Also such diamines further containing hetero atoms such a phosphorus and sulfur are likewise useful.

As the dibasic acids, those compounds expressed by the general formula $HOOC-R-COOH$ (in which R is a divalent hydrocarbon radical) are intended, and of which specific examples include aliphatic dibasic acids such as oxalic acid, adipic acid, sebacic acid and the like; aromatic dibasic acids such as terephthalic acid, isophthalic acid, 1,6-naphthalenedicarboxylic acid and the like; and alicyclic dibasic acids such as 1,2-cyclobutanedicarboxylic acid. Furthermore, dibasic acids containing hetero atoms such as phosphorus and sulfur can also be used.

Needless to say, derivatives of the foregoing compounds (esters, for example) may be used.

Copolymers obtained from optional combinations of the foregoing starting components or their mixtures are used as the starting polyamide.

Also these polyamide-forming monomers may partly contain those having in their main chains or side chains other functional groups such as ester, ether, thioether, urea, double and urethane linkages.

The polyamides may also contain as the copolymerized component such compounds as hydroxycarboxylic acid, aminoalcohol, diol, lactone, diisocyanate, polycarboxylic acid and polyamine, to such an extent will not appreciably change the useful properties inherent in polyamide.

When a polyamide mixture is used as the polyamide component, the resultant block polymer may be a block polyesteramide composed of three or more specific components or, it may be a mixture of two or more types of block polyesteramide.

Among the afore-listed polyamides, polycapramide and polyhexamethylene adipamide are the most preferred. The polyamides may also contain coloring matter, delusterant, heat resisting agent and light resisting agent, or the polymerization catalyst residue may remain therein.

As the polyester component, any of homopolymers, copolymers and polymeric mixtures of any composition can be used, the typical of them being, for example, homopolymers such as polyethylene terephthalate, polyethylene adipate, polyethylene isophthalate, polyethylene carbonate and poly-p-ethylene oxybenzoate, copolymers thereof and polymeric mixtures thereof. In case a polyester mixture is used as the polyester component, the resultant block polyesteramide may be composed of three or more specific components or may be a mixture of two or more types of block polyesteramides.

The dibasic acids to form the polyesters include, for example, carbonic acid, aliphatic dicarboxylic acids such as oxalic, adipic, azelaic and sebacic acids; aromatic dicarboxylic acids such as terephthalic, isophthalic, phthalic and 2,6-naphthalenedicarboxylic and diphenic acids; alicyclic dicarboxylic acids such as 1,2-cyclobutanedicarboxylic acid; organic dicarboxylic acids containing hetero elements other than carbon, hydrogen and oxygen atoms such as diphenylsulfone-4,4'-dicarboxylic, diphenylsulfonamide-4,4'-dicarboxylic, 5-sodiumsulfoisophthalic and 5-methylsulfoisophthalic acids; and polycarboxylic acids such as trimellitic and pyromellitic acids.

The oxy compounds as the other polyester-forming component include, for example, aliphatic diols such as ethylene glycol, diethylene glycol, propylene glycol, polyethylene glycol, butane diol, thioglycol and dimethanol; diols having aromatic component such as p-xylene glycol, 2,2-bis(p-2-oxyphenyl)propane and 2,2-bis(p-oxyethoxyphenyl)propane; alicyclic diols such as cyclohexane diol-1,4; polyols such as glycerine and pentaerythritol; and oxycarbonic acids such as p-ethoxybenzoic, vanilic, p-oxymethylbenzoic and glycolic acids.

Again those polyester-forming monomers may partly contain those having in their main chains or side chains other functional groups such as amide, ether, thioether, urea, double or urethane linkages.

The polyesters may also contain as the copolymerized component such compounds as diamine, amino acid, amino alcohol, diisocyanate and polyamine, to such an extent as will not appreciably change the useful properties inherent in the polyesters.

Among the aforementioned polyesters, those of which dicarboxylic acid component is terephthalic acid are preferred, inter alia, polyethylene terephthalate. The polyesters may also contain coloration inhibiting agent, delusterant, heat resisting agent, light resisting agent or the catalyst residue employed for the polymerization.

In the subject process the polyamides may be fiber-forming or not fiber-forming, and normally have molecular weight preferably ranging 1,000–30,000. Again either fiber-forming or not fiber-forming polyesters are useful, of which normally preferred molecular weights ranging 2,000–30,000. The blocking reaction in accordance with the subject invention progresses with equal smoothness regardless the reactants are fiber-forming or not. In case the polyamides and/or polyesters of molecular weights below the lower limits are used, the resultant block polyesteramides tend to have degraded properties. On the other hand when they exceed the upper limit, the products have very high melt viscosities and accordingly their melt-spinning is very difficult.

The types of reactions between the end groups of polyamide and polyester are the following four.

|       | End group of polyamide |   | End group of polyester |
|-------|------------------------|---|------------------------|
| (I)   | —NH₂                   | + | —COOH                  |
| (II)  | —NH₂                   | + | —COOR                  |
| (III) | —NH₂                   | + | —COOROH                |
| (IV)  | —COOH                  | + | —COOROH                |

(in the above, R standing for a hydrocarbon residue)

In case the end groups of polyester are —COOH or —COOR, it is preferred that no less than 50% of the end groups of the polyamide to be reacted with the polyester should be amino. Again when no less than 50% of the end groups of polyamide are carboxyl group, the reaction of type (IV) above must be employed. Therefore it is preferred in the case that no less than 50% of the entire end groups of the polyester used should be —COOROH. As shown in Example 1, block polyesteramide obtained from such polyamide of which end amino group content is greater than its end carboxyl group content shows excellent spinnability. Preferably the end amino groups should occupy about 60% or above of the total end groups, inter alia, about 90% or above. When a polyamide in which no less than about 60% of the end groups are amino group is subjected to the solid phase polymerization, first the self-dehydration condensation of the polyamide takes place, and as the result more than about 90% of its end groups become amino group and thereafter the condensation polymerization of such polymerization of such polyamide and polyester follows.

In the above case, the length of the polyamide blocks in the product block polyesteramide is longer than that of the starting polyamide before the dehydration condensation, and the blocks are irregular. Accordingly in order to obtain block polyesteramide of regular block length, the greater the amino group content of the starting polyamide, the better.

Again in case provision of block polyesteramide having relatively short units of polyamide and polyester block lengths is intended, starting materials of less molecular weight within the afore-specified ranges should be selected.

For increasing the degee of the condensation polymerization of block polyesteramide, it is preferred that the mol ratio of the end amino groups to end ester groups (—R—CO—OR'—OH) and/or end carboxyl groups is 1:1.

Also when a polymer having amino group at both ends is used at a greater ratio than the other type of polymer, the resultant block polyesteramide has greater end amino group content and excellent dyeability.

The solid mixtures of the polyamide and polyester used for the solid phase reaction are of the following types.

(i) A melt-blended, intimate solid mixture in which at least one polyamide and at least one polyester are uniformly dispersed and present each as an independent phase. Such a solid mixture can be obtained by melt-blending the polyamide and the polyester for a sort time to an extent as will secure the uniform dispersion of the components. During the melt-blending, the system is preferably violently stirred and mixed by means of an inert gas stream such as of $N_2$, $CO_2$ and argon.

In that melt-blending, the polyamide and polyester substantially do not, and must not, chemically react with each other. For example, for making a solid mixture of polycapramide or polyhexamethylene adipamide as the polyamide with polyethylene terephthalate as the polyester, it is necessary to melt-blend the two at 260–320° C. within 20 minutes. Any substantial degree of chemical reaction between the two will prevent the accomplishment of the objects of the invention.

It is desirable to immediately shape the solid mixture resulted from the melt-blending into such forms as chips, pelletts and flakes, inter alia, chips.

In certain cases the solid mixture can be obtained by melt-blending of a molten component with the other component in powder form of softened state.

The substantial absence of chemical reaction during the melt-blending of the polyamide and polyester for making a solid mixture is as described in the later appearing examples, and the principle for proving such is as follows. To wit, if the polyamide and the polyester chemically react to form a copolymer, the intrinsic viscosity of the product [η] will rise above those of the starting polyamide and polyester. Therefore that the melt-blended solid mixture of the starting polyamide and polyester signifies the ing materials indicates the absence of the polymerization reaction between the polyamide and polyester. As described in Example 1, it is clear that the polymers in the melt-blended solid mixture in accordance with the invention are not mutually reacting.

Again a relative viscosity in conc. sulfuric acid, $\eta r^{H_2SO_4}$ is the value of viscosity measurement influenced by the sequence length of polyamide parts alone, as the conc. sulfuric acid decomposes the polyester parts in the polymer chain and converts the polymer to low molecular compounds. Accordingly, that the $\eta r^{H_2SO_4}$ of the melt-blended solid mixture is same to that of the simple mixture of the starting polyamide and polyester signifies the absence of chemical reaction. This is again demonstrated in Example 1.

Furthermore the proof can be obtained also by measuring mol concentration of end amino group of the starting materials and of the solid mixture.

(ii) A solid mixture obtained by kneading at least one polyamide and at least one polyester both at softened state.

(iii) A solid mixture obtained by dissolving at least one polyamide and at least one polyester in a solvent and thereafter distilling off the solvent from the solution.

(iv) A precipitated solid mixture obtained by dissolving at least one polyamide and at least one polyester in a solvent, and thereafter pouring the solution into a liquid which dissolves neither of the polyamide and polyester.

(v) A solid mixture obtained by dissolving either at least one polyamide or at least one polyester in a solvent and dispersing the other in the same solvent, and thereafter distilling off the solvent from the dispersion.

(vi) A precipitated solid mixture obtained by dissolving either at least one polyamide or at least one polyester in a solvent and dispersing the other in the same solvent, and thereafter pouring the dispersion into a liquid which dissolves neither of the polyamide and polyester.

The solvents useful for making the mixtures of the types (iii) through (vi) include, for example, phenol, cresol, o-chlorophenol, dimethylsulfoxide, dimethylacetamide, diphenylether, 4,4'-isopropylidene diphenol and resorcinol.

As the liquids which do not dissolve the polyamide and polyester as employed in the types (iv) and (vi), alcohols such as methanol, ethanol and propanol may be named.

(vii) A solid mixture composed of at least one powdery polyamide and at least one powdery polyester.

Such a mixture is obtained by mixing the components by the means known per se, such as a ball mill and the like.

Furthermore in the invention it is also possible to form solid mixtures as above, containing polymers other than the polyamide and polyester components mixed therein. As such other polymers, for example, polyurethane, polyurea, polystyrene and polypropylene may be named.

The block polyesteramide is obtained at any optional ratio of the reactants polyamide and polyester, but for obtaining such block polyesteramide possessing concurrently the advantageous properties of polyamide and polyester, the weight ratio within the range of 30–70% of one of the components and 70–30% of the other is preferably adopted.

The reaction again is performable in the presence of polymer or polymers other than the polyamide and polyester components. In that case, a solid mixture containing such polymer other than the polyamide and polyester as aforesaid should be used. The product then is a mixture of the block polyesteramide with the polymer. As such other polymer, for example, polystyrene, polypropylene polyurethane and polyurea may be named, and by suitably selecting specific polymer or polymers, product of desired properties can be obtained.

The solid phase reaction of the solid mixture in accordance with the invention is normally performed at reduced pressures, or at atmospheric pressure in an inert gas stream. It is of course permissible to perform the reaction at reduced pressures in an inert gas stream.

As the inert gas, nitrogen, carbon dioxide and argon gases are preferred.

The reaction temperature must be selected within the range above the second order transition point of any of the polyamide or polyester components having the highest second order transition point and below the melting point of the component having the lowest melting point. For example, in case polycapramide is used as the polyamide and polyethylene terephthalate, as the polyester, the reaction temperature should range 150–217° C., preferably 180–205° C. Also when polyhexamethylene adipamide and polyethylene terephthalate are used, the temperature should be within the range of 150–264° C., preferably 180–240° C.

In case a mixture of more than two components is used, as aforesaid, of course a temperature range at which the solid phase reaction can substantitlly progress is employable.

The reaction may also be carried out at atmospheric pressure in an inert gas stream heated in advance, with or without the positive heating.

The reaction time depending on the reaction temperature, it normally ranges 3–100 hours, preferably 3–48 hours. When the reaction is of the type (IV), the reaction time required is relatively longer compared with the cases (I), (II) and (III).

The solid phase polymerization reaction fairly smoothly progresses without the use of catalyst, but it advantageously proceeds in the presence of a suitable catalyst. Normally employable catalysts include, for example, PbO, $Bi_2O_3$, $GeO_2$, $SbF_3$, $Sb_2O_3$, $As_2O_3$, MgO, $Na_2CO_3$, $TiO_2$, $SnCl_2$, $(NH_4)_2SO_4$, $H_3PO_4$ and acetic acid.

According to the subject process, the block lengths of the polyamide and polyester can be freely controlled and the desired block polyesteramide can be obtained. Also because it produces the block polyesteramide by solid phase reaction of solid mixture of polyamide and polyester, the processing is not only very simple of operation but also it dispenses with the drying step of the product and is industrially highly advantageous.

Thus obtained block polyesteramide is well-melt-spinnable by conventional means, and the resultant filaments have excellent tenacity, durability, dyeability, initial modulus and stiffness as aforesaid.

The invention also embraces the process whereby the said block polyesteramide is mixed with other polymer or polymers and the mixture is melt-spun. Such other polymers are not limited to specific type and include polymers which are stable at the time of melting, such as polyamide, polyester, polyurethane, polyurea, polystyrene and polypropylene, their copolymers and mixtures. Particularly when the block polyesteramide is mixed with polyamide and polyester and molten, the polyamide and polyester are not separated but uniformly dispersed. Consequently the mixing of polyamide with polyester and the melt-spinning of the mixture are easier than the cases of known methods, and the resultant filaments have equally excellent properties as of the block polyesteramide. The manner of practice is as follows:

Each predetermined amount of polyamide chips and the block polyesteramide chips are mixed by any conventional mechanical means, and the mixture is molten. Thus obtained melt is fed to a spinning machine capable of mixing, and melt-spun with mixing under predetermined spinning conditions to be made into as-spun filaments, which are then cold- or hot-drawn by 3.0–6.0×. For the cold drawing, cold pin may be applied to the as-spun filaments and for the hot drawing, heated pin and/or plate can be employed.

The spinning temperature is not very critical so far as it is above the melting point of the polymers and below 350° C. In case, for example, a block polyesteramide of polycapramide and polyethylene terephthalate, and polycapramide and/or polyethylene terephthalate are used, the spinning temperature may range 240–320° C., preferably 270–290° C. At below 240° C., satisfactorily melt mixture which will give the filaments of expected properties cannot be obtained. Also at the spinning temperature above 320° C., the quality degradation of the molten polymers takes place.

The preferred melting time of the block polyesteramide and other polymer or polymers ranges 2–60 minutes. Before 2 minutes, sufficient melt-blended effect of the components cannot be obtained and with melting time longer than 60 minutes, esteramide interchange reaction and random reaction tend to take place, producing undesirably colored filaments having low initial modulus.

Any known melt-spinning means is applicable for the melt-spinning of the block polyesteramide which is optionally mixed with other polymer or polymers.

The melt-spinning contemplated in the invention includes that of a blend of block polyesteramide consisting of more than two components with a polymer or polymers.

Further, the invention includes the process for the preparation of composite or conjugated filaments comprising conjugate-spinning the block polyesteramide with other polymer or polymers at molten state. Such a process is free from the deficiencies accompanying the known methods, due to the use of the block polyesteramide obtained in the described manner. To wit, such preparation process of conjugated filaments is easily operable, and the resultant conjugated filaments have high Young's modulus, high stiffness, high tenacity and durability. The contemplated polymers in this case are not limited to any specific type, but normally the polymers which are stable at the time of melting such as polyamide, polyester, polyurea, polyurethane, polystyrene, polypropylene, copolymers and mixtures thereof are employed.

Taking the example of polyamide-containing conjugated filaments, there are following four combinations of components known.

(1) Homopolyamides of same type having different relative viscosities;
(2) A homopolyamide and a random copolyamide;
(3) A homopolyamide and a polyamide mixture;
(4) A homopolyamide and a polyester.

The improved conjugated filaments and the method for making the same of the invention will be explained comparing with the conventional conjugated filaments of above combinations, and methods for their preparation.

The first combination is very poor of spinning operability because the components have markedly different melt viscosities due to said difference in relative viscosity, and therefore the melt conjugated polymer greatly bends when extruded from the spinneret. Consequently the method requires strict operational control during spinning and a special device for the spinneret.

The second combination is deficient in that the spinning operability is poor because one component of the composite polymer is a random polyamide having a low melting point, and that the cost is high. Also the resultant conjugated filaments have very poor thermal and mechanical properties, also due to the use of the random copolymer.

The third combination encounters the difficulty of uniformly distributing the polyamide mixture. For example, when preparation of side-by-side type crimped yarn from this combination is intended, the crimped conjugated filaments obtained by simple chip-blending of the materials by means of an extruder has irregular crimp distribution and is unsuitable for usages requiring uniform crimp. If the two components are well melt-blended for overcoming this drawback, objectionable amide interchange reaction and random copolymerization take place to make the spinning operation difficult and to degrade the thermal and mechanical endurance of the product conjugated filaments.

The last combination is again deficient in that, when the side-by-side type conjugated filaments from this combination is drawn, peeling off of the two starting components takes place and satisfactory conjugated yarn cannot be obtained.

The preparation method of conjugated filaments in accordance with the invention and the resultant conjugated filaments are not only entirely free from the operational and equipmental deficiencies of first combination, operational, economical and qualitative deficiencies of the second combination, and qualitative deficiencies of the third and fourth combinations, but also have the following advantages, all due to the employment of the block polyesteramide of the invention. To wit, the fabrics prepared from the conjugated filaments of the invention have unique bulk properties and excellent hand. Also by varying the block polyesteramide content of the conjugated filaments, either latent or visible crimp yarn can be prepared, and in all cases the products have high tenacity and durability.

The preparation method of the conjugated filaments of this invention will be explained hereinbelow.

The block polyesteramide of the invention together with other polymer such as a homopolyamide, copolyamide or their blend is spun by means of known conjugate-spinning means, under predetermined spinning temperature and conditions, and the resultant as-spun filaments are cold-drawn or hot-drawn by 3.0–4.0× with an ordinary drawing machine. The quantitative ratio of the block polyesteramide to the other polymer in the composite yarn is not critical, but preferably it is 17–570 parts of the latter, inter alia, 35–300 parts, to 100 parts of the former. The spinning temperature is not critical so far as it is within the range of above the melting point of the polymers and below 350° C., but the preferred range is 230–300° C., inter alia, 240–290° C. The form of the conjugation may be core-and-sheath type or side-by-side type.

When polymers other than polyamide is used, the conjugate-spinning conditions can be experimentally determined according to the properties of the specific polymer employed. Any known conjugate-spinning means can be applied for the spinning of the block polyesteramide of the invention with other polymer.

Of course the process for making conjugated yarn of the invention includes the mode of making conjugated yarn composed of more than two specific components of the block polyesteramide and other polymer. It is likewise possible to employ, as one of the components of the conjugated yarn, a blend of block polyesteramides or of block polyesteramide with polyamide or other polymer.

The invention now will be explained in further details with reference to working examples, it being understood that they are in no sense limitative of the scope of the invention.

In the examples, parts are by weight.

EXAMPLE 1

In this example, the solid phase polymerization in accordance with this invention will be compared with the conventional manner of polymerization in molten state.

Polymerization in molten state

Polycapramide obtained by polymerization of $\epsilon$-caprolactam and hexamethylenediamine and of which end groups were 98% amino group was mixed with polyethylene terephthalate at 1:1 weight ratio. The mixture was then placed in a flask provided with a vacuum stirrer, a thermometer, a nitrogen inlet and a vacuum outlet, and after nitrogen-substitution of the atmosphere, molten by heating at 280° C. under a reduced pressure of 1–2 mm. Hg. For the complete melting of the mixture about 30 minutes was required, and the polymerization times given in later-appearing Tables 1 and 2 do not include this melting time. The mixture was stirred for a predetermined period, and thereafter the pressure in the flask was returned to atmospheric. The resultant melt was thrown into water and the product was recovered.

Process of the invention: polymerization in solid state

Polycapramide obtained by polymerization of $\epsilon$-caprolactam and hexamethylenediamine and of which end groups were 98% amino group was melt-blended with polyethylene terephthalate in nitrogen current by means of an extruder, at the blending ratio of 1:1. The staying time of the molten mixture in the extruder is about 8 minutes. In the meantime the intrinsic viscosity $[\eta]^{ocp}$ of the molten mixture showed substantially no variation from that of the starting polymers as can be understood from Tables 1 and 2, indicating that substantially no polymerization between the polycapramide and polyethylene terephthalate took place. The melt mixture was ground, and thus divided product was heated at 1–2 mm. Hg and 180° C. for a predetermined period.

During the above polymerization processes are under progress, the products were taken out at indicated time intervals, and their intrinsic viscosities $[\eta]^{ocp}$ (measured in o-chlorophenol at 25° C.), relative viscosities $\eta r^{H_2SO_4}$ in conc. sulfuric acid were measured and also their color tones were observed, with the results as shown in Tables 1 and 2. The $\eta r^{H_2SO_4}$ was measured at the concentration of 1.0 g./100 cc. $H_2SO_4$ at 25° C. In conc. surfuric acid the sequence of polyester parts are decomposed and the product is converted to low molecular weight compounds, and therefore the sequence length of polyamide parts alone is expressed as $\eta r^{H_2SO_4}$.

Table 1 shows the results with the case when the molecucular weight of the starting polycapramide was 3,900 and that of the starting polyethylene terephthalate, 4050.

measured, the former value was $2.43 \times 10^{-4}$ mol/g. and the later, $2.29 \times 10^{-4}$ mol/g., which indicate the substantial absence of polymerization between the mixture components.

Table 2 shows the results with the case when the molecular weight of the starting polycapramide was 11,000, and that of the starting polyethylene terephthalate, 10, 7, 00.

Table 2

| Polymerization time (hr.) | | Powdery b) mixture | 0 | 0.5 | 2 | 4 | 6 | 12 | 24 |
|---|---|---|---|---|---|---|---|---|---|
| Process of the invention | $[\eta]^{ocp}$ | 0.532 | 0.530 c) | – | – | 0.710 | 0.800 | 0.850 | 0.912 |
| | $\eta r^{H_2SO_4}$ | 1.732 | 1.707 | – | – | 1.708 | 1.712 | 1.720 | 1.718 |
| | Color a) | ◎ | ◎ | ◎ | ◎ | ◎ | ◎ | ◎ | ◎ |
| Melt polymerization | $[\eta]^{ocp}$ | 0.532 | 0.530 | 0.695 | 0.701 | 0.603 | 0.600 | – | – |
| | $\eta r^{H_2SO_4}$ | 1.732 | 1.707 | 1.682 | 1.532 | 1.102 | 1.101 | – | – |
| | Color a) | ◎ | ◎ | ○ | △ | × | ×× | ×× | ×× | a) Color: ◎ : white ○ : yellowish white, △ : brown
× : dark brown ×× : blackish brown b) Powdery mixture before melting;

c) Melt mixture immediately after passing through the extruder.

Because $[\eta]^{ocp}$ of the powdery mixture before blending in the extruder was 0.532 and that of the melt mixture after the blending was 0.530, it can be understood that substantially no polymerization took place during this melt-blending step. Also when the amino end group concentrations of the polymeric mixture before and after the melt blending were measured, the former value was $1.03 \times 10^{-4}$ mol/g. while the latter was $1.09 \times 10^{-4}$ mol/g. This negligible difference between the two values again indicates the absence of polymerization reaction.

From the above Tables 1 and 2, it will be understood that the product of the solid phase polymerization in accordance with the invention is less colored by thermal de- Table 1

| Polymerization time (hr.) | | Powdery b) mixture | 0 | 0.5 | 1 | 2 | 4 | 6 | 12 | 24 |
|---|---|---|---|---|---|---|---|---|---|---|
| Process of the invention | $[\eta]^{ocp}$ | 0.347 | 0.352 c) | – – | 0.413 | – – | 0.663 | 0.735 | 0.817 | 0.833 |
| | $\eta r^{H_2SO_4}$ | 1.353 | 1.352 | – – | 1.355 | – – | 1.360 | 1.357 | 1.353 | 1.359 |
| | color a) | ◎ | ◎ | ◎ | ◎ | ◎ | ◎ | ◎ | ◎ | ○ |
| Melt polymerization | $[\eta]^{ocp}$ | 0.347 | 0.378 | 0.406 | 0.557 | 0.711 | 0.803 | – – | – – | – – |
| | $\eta r^{H_2SO_4}$ | 1.353 | 1.352 | 1.300 | 1.132 | 1.071 | 1.002 | – – | – – | – – |
| | color a) | ◎ | ◎ | ○ | △ | × | ×× | ×× | ×× | ×× | a) Color: ◎ : white ○ : yellowish white △ : brown
× dark brown ×× : blackish brown b) Powdery mixture before melting, c) Melt mixture immediately after passing through the extruder.

That substantially no polymerization took place during the melt-blending is proven as follows. The polymeric mixture having an $[\eta]^{ocp} = 0.347$ (intrinsic viscosity of the mixture formed simply by mechanical mixing) had, after the melt-blending in the extruder, that of 0.352. Thus substantially no polymerization took place. Again when the amino end group concentrations of the polymeric mixture before and after the melt-blending were composition than that of the melt polymerization. Also the constant $\eta r^{H_2SO_4}$ value of the product of the invention throughout the polymerization time indicates that the sequence length of polyamide part is also constant, viz., that the obtained product is a block polymer. On the conttrary $\eta r^{H_2SO_4}$ of the melt polymerization product decreased with the increase in polymerization time, which means that in the melt polymerization an esteramide interchange reaction took place simultaneously with the polymerization reaction and as the result the product approached to random copolymer with the time passage. Thus the melt polymerization procedure and the solid polymerization process of the invention are different in the structure of the product polymer. This fact is substantiated also by the results of differential thermal analysis, X-ray analysis and N.M.R. analysis.

Furthermore, the products of the two procedures having about the same order of intrinsic viscosity as seen from Table 1 (to wit, that after 12 hours' polymerization of the solid phase process and that after 4 hours' polymerization of the melt process) were melt-spun, and the filaments were drawn at 110–150° C. by 4.0×. The properties of the drawn filaments were as given in Table 3.

TABLE 3

|  | Tenacity, g./d. | Elongation, Percent | Initial modulus g./d. |
|---|---|---|---|
| Filaments of melt process | 1.3 | 15.3 | 30.2 |
| Filaments of this invention | 4.3 | 35.7 | 59.9 |

The drawing of the filaments from the melt process was difficult. Whereas the product in accordance with the invention had both good spinnability and drawability, and the resultant filaments had greater tenacity than that of the product of the melt process and higher initial modulus than that of conventional polycapramide filaments.

EXAMPLE 2

Polycapramides of varied amino end group contents were synthesized by adding to ε-caprolactam varied amounts of hexamethylenediamine or adipic acid. The molecular weights of the polycapramides were, in all cases, about 5,000.

Each of the polycapramides and polyethylene terephthalate (molecular weight: about 4,700) at the weight ratio of 1:1 were dissolved in m-cresol, and the resultant solution was poured into methanol to form a precipitate. Thus obtained powdery product was heated at 200° C. for 12 hours at 1–2 mm. Hg and thus polymerized in solid state. The product polymer was tested of its spinnability by means of a spinning test machine. The test results of the spinnability of the polymers from polycapramides of varied amino end group contents were as given in Table 4.

group content are used as the starting material, polymeric products of good spinnability can be obtained.

EXAMPLE 3

To a solution formed by dissolving 50 parts of a polycapramide of which 98% of the end groups was amino group and having a molecular weight of 4,900 in formic acid, 50 parts of finely divided polyethylene terephthalate (about 100 mesh, molecular weight: 5,000) was added and uniformly suspended. From the suspension the formic acid was evaporated off at a maximum rate possible, and the remaining polyester/polyamide mixture was recovered, followed by heating for the periods indicated in Table 5, at 200° C. under a reduced pressure of 1–2 mm. Hg. The results of the solid phase polymerization of the mixture by suspension method were as given in Table 5 below.

TABLE 5

| Polymerization time (hr.) | 0 | 2 | 4 | 6 | 12 | 24 | 48 |
|---|---|---|---|---|---|---|---|
| $[\eta]^{ocp}$ [1] | 0.365 | 0.366 | 0.403 | 0.465 | 0.765 | 0.821 | 0.830 |

[1] $[\eta]^{ocp}$ = value measured in o-chlorophenol at 25° C.

From Table 5, it can be understood that with the solid phase polymerization of solid mixture from suspension method, likewise satisfactory results can be obtained.

EXAMPLE 4

Polyethylene terephthalate (molecular weight 5,300) was reacted with adipoly chloride in nitrobenzene to have the end groups converted to —COCl and further reacted with water or methanol. Polyethylene terephthalate of which end groups were carboxyl group or methylester group of carboxylic acid was obtained.

Also polyhexamethylene adipamide (molecular weight 7,900, nylon-66) of which end groups were 98% amino group was prepared by polymerization of a nylon salt of hexamethylenediamine and adipic acid with hexamethylenediamine further added to the nylon salt.

Eight (8) parts of said polyethylene terephthalate and

Table 4

| Amino end group content of polycapramide (%) | 3 | 23 | 47 | 63 | 76 | 98 |
|---|---|---|---|---|---|---|
| $[\eta]^{ocp}$ before solid phase polymerization [a] | 0.334 | 0.337 | 0.401 | 0.400 | 0.371 | 0.337 |
| $[\eta]^{ocp}$ after solid phase polymerization [a] | 0.433 | 0.790 | 0.876 | 0.801 | 0.773 | 0.798 |
| Spinnability [b] | ✗ | ✗ | △ | ○ | ○ | ○ |

[a] $[\eta]^{ocp}$: value measured in o-chlorophenol at 25°C.

[b] Spinnability: ✗: not operable

△: spinnable but the product had many knots and a wide denier variation

○: easily spinnable

From the above results it can be understood that when polyamides having no less than about 50% amino end 5 parts of said polyhexamethylene adipamide were dissolved in cresol and well mixed, the resultant solution being poured in methanol to yield a powdery mixture. By heating the mixture at 230° C. for the indicated periods under a reduced pressure of 1-2 mm. Hg, the polyethylene terephthalate and the polyhexamethylene adipamide were reacted.

The results of thus using polyethylene terephthalate (PET) having —COOH or —COOCH$_3$ end group and nylon-66 as the starting materials are shown in Table 6.

TABLE 6

| | Polymerization time (hr.) | | | | | |
|---|---|---|---|---|---|---|
| | 0 | 3 | 6 | 8 | 10 | 12 |
| $[\eta]^{ocp1}$ of product: | | | | | | |
| In case PET had —COOH end groups | 0.439 | 0.509 | 0.721 | 0.769 | 0.809 | 0.885 |
| In case PET had —COOCH$_3$ end groups | 0.453 | 0.683 | 0.903 | 0.991 | 1.305 | 1.606 |

[1] $[\eta]^{ocp}$ = value measured in o-chlorophenol at 25° C.

As can be understood from Table 6, about the same satisfactory results as of Example 1 were obtained.

EXAMPLE 5

Fifty (50) parts of polycapramide (molecular weight: 4,900) of which 98% of the end groups was amino group and which was obtained by polymerization of ε-caprolactam and m-xylylenediamine and 50 parts of polyethylene terephthalate (molecular weight: 5,200) were melt-blended in nitrogen current by means of an extruder. The resultant melt mixture was finely divided, and heated to 200° C. for 12 hours at atmospheric pressure in 200° C. nitrogen stream. The polymer thus prepared by the reaction of the polycapramide and the polyethylene terephthalate had an $[\eta]^{ocp}$ of 0.785.

EXAMPLE 6

Twenty-five (25) parts of a polycapramide (molecular weight: 4,900) of which 98% of the end groups was amino group, 25 parts of polyhexamethylene adipamide (molecular weight: 5,100) of which 97% of the end groups was amino group, and 50 parts of polyethylene terephthalate (molecular weight: 5,300) were mixed in a solution in the manner of Example 2 to form a solid mixture. The mixture was subjected to a solid phase polymerization by heating at 200° C. for 12 hours at a reduced pressure of 1-3 mm. Hg. The resultant product was melt-spun, and drawn by 4.5× at 150° C. The properties of the resultant filaments were as shown in Table 7.

TABLE 7

| | Tenacity, g./d. | Elongation, percent | Initial modulus, g./d. |
|---|---|---|---|
| Filaments of the invention | 6.3 | 24.7 | 76.3 |
| Polycapramide filament | 8.1 | 23.5 | 38.9 |
| Polyhexamethylene adipamide filament | 7.3 | 22.5 | 40.1 |

As can be understood also from Table 7, filament of high initial modulus was obtained.

Again the result of dyeing the same filament with an acid dye (Xylene Fast Blue PR) is shown in Table 8, together with the results of similarly dyeing varied types of conventional filaments.

TABLE 8

| | Dye absorption, percent[1] |
|---|---|
| Filament of the invention | 79.3 |
| Polycapramide filament | 94.5 |
| Polyhexamethylene adipamide filament | 88.0 |
| Polyethylene terephthalate filament | [2] 20.3 |

[1] Dyeing conditions:
Dyestuff 2% on weight filament.
Acetic acid 3% on weight filament.
Bath ratio 1:100, 98° C., 100 minutes.
[2] The filament of this invention, the polycapramide filament and the polyhexamethylene adipamide filament retained the dyestuff when washed with water after the dyeing. Whereas, polyethylene terephthalate filament failed to retain the dye pickup during the water-washing after the dyeing, indicating that the same was not dyed in substance.

EXAMPLE 7

Sixty (60) parts of a polycapramide (molecular weight: 3,100) of which 96.0% of the end groups was carboxyl group and which was obtained by polymerization of ε-caprolactam and adipic acid and 40 parts of polyethylene terephthalate (molecular weight: 2,100) were melt-blended in nitrogen current by means of an extruder.

The melt-blend was pulverized and heated at 200° C. for 65 hours under a reduced pressure of 1-2 mm. Hg to perform the solid phase polymerization of the said polymers. The analysis values of the product were as shown in Table 9.

TABLE 9

| | Before reaction | After reaction |
|---|---|---|
| $[\eta]^{ocp}$ of product [1] | 0.248 | 0.791 |
| [COOH] of product,[2] mol./g | 4.08×10$^{-4}$ | 0.803×10$^{-4}$ |

[1] $[\eta]^{ocp}$ = value measured in o-chlorophenol at 25° C.
[2] [COOH] = value obtained by alkalimetry of the product dissolved ian o-cresol/chloroform mixed solvent (7:3 weight ratio).

The filament obtained by spinning the same polymeric product by a spinning test machine and hot-drawing the same had the properties as follows:

Tenacity ——————————————————— g./d.   4.8
Elongation ——————————————————— percent   26.9
Initial modulus ——————————————————— g./d.   70.2

Thus a filament having a higher initial modulus compared with conventional nylon-6 filament was obtained.

EXAMPLE 8

Forty (40) parts of a polycapramide (molecular weight: 7,200) of which 95% of the end group was carboxyl group and which was obtained by polymerization of ε-caprolactam and terephthalic acid and 30 parts of polyethylene terephthalate (molecular weight: 5,100) were dissolved in m-cresol and thoroughly mixed in the solution state. Pouring the solution into methanol, the resultant precipitate was dried at 80° C. under a reduced pressure, and the so obtained powdery mixture was heated at 200° C. for 75 hours under a reduced pressure of 1-2 mm. Hg to perform the reaction of the two polymers.

The analysis values of the product are shown in Table 10.

TABLE 10

| | Before reaction | After reaction |
|---|---|---|
| $[\eta]^{ocp}$ of product [1] | 0.470 | 0.889 |
| [COOH] of product,[2] mol./g | 1.58×10$^{-4}$ | 0.481×10$^{-4}$ |

[1] $[\eta]^{ocp}$ = value measured in o-chlorophenol at 25° C.
[2] [COOH] = value obtained by alkalimetry of the product dissolved in a o-cresol/chloroform mixed solvent (7:3 weight ratio).

The filament obtained by spinning and drawing the polymeric product had the following properties.

Tenacity _____ g./d__ 5.1
Elongation _____ percent__ 25.9
Initial modulus _____ g./d__ 72.1

EXAMPLE 9

Seventy (70) parts of a polycapramide (molecular weight: 13,400) of which 98% of the end groups was amino group, 30 parts of polyethylene terephthalate (molecular weight: 5,100) and 50 p.p.m. of copper acetate as a copper component were melt-blended by means of an extruder, and the resultant blend was formed into chips. By heating the chips at 200° C. for 12 hours under a reduced pressure of 1–3 mm. Hg, the said components were polymerized in solid state. When the product was melt-spun and drawn by 5.0× at 140° C., the resultant filament had the properties as given in Table 11.

TABLE 11

| | Tenacity, g./d. | Elongation, percent | Initial modulus, g./d. | C.R.[1] value, g./d. | Static[2] charge voltage, v. |
|---|---|---|---|---|---|
| Filament of the invention | 7.5 | 19.5 | 63.4 | 0.52 | 1,500 |
| Polycapramide filament | 8.1 | 23.5 | 38.9 | 0.01 | 3,200 |

[1] C.R. value: Compliance ratio $C.R. = \dfrac{10/L_{(10)} - 10/L_{(5)}}{5}$
$L_{(x)}$ is the value of stress under x% elongation expressed by g./d.
[2] Static charge voltage: voltage generated when the filament is circularly knit and rubbed.

As can be understood from the table, filament having high initial modulus and C. R. value indicating high degree of stiffness was obtained. Also the product's static charge voltage was smaller than that of the polycapramide filament. Furthermore the filament of the invention could be deeply dyed with an acid dye (Xylene Fast Blue PR), while the polyethylene terephthalate filament could not.

EXAMPLE 10

Forty (40) parts of a polyethylene terephthalic (molecular weight: 16,500), 40 parts of a commercial polycapramide (molecular weight: 18,000) and 20 parts of the block polyesteramide obtained in Example 5 were blend-spun by means of an extruder type spinning machine, and the as-spun filaments were hot-drawn at 150° C. by 5.0×. The spinning and drawing were well operable. The properties of the drawn filaments are shown in Table 12. For control, 50 parts of the polyethylene terephthalate and 50 parts of polycapramide were blend-spun under the same conditions as above except that the block polyesteramide was not used, but filament breakage occasionally took place and the spinning was practically inoperable.

EXAMPLE 11

Five (5) parts of a polyethylene adipate (molecular weight: 12,000), 95 parts of a polyethylene terephthalate (molecular weight: 16,500) and 30 parts of a polycapramide (molecular weight: 7,500) were melt-blended in nitrogen current by means of an extruder. The melt blend so obtained was finely divided, and heated at 175° C. for 12 hours under a reduced pressure of 1–2 mm. Hg to effect the solid phase polymerization of said polymers. The reaction product was melt-spun, and the as-spun filaments were drawn by 4.5× at 150° C. The properties of the drawn filaments are given in Table 13 below.

TABLE 13

| | Tenacity, g./d. | Elongation, percent | Initial modulus, g./d. | Dye[1] absorption, percent |
|---|---|---|---|---|
| Filament of the invention | 5.3 | 22.3 | 98.7 | 81.3 |
| Polycapramide filament | 8.1 | 23.5 | 38.9 | 94.5 |
| Polyethylene terephthalate filament | 6.4 | 20.3 | 120.7 | 20.3 |

[1] Measured in the manner described in Example 6.

EXAMPLE 12

Supplying a block polyesteramide of the invention from one hopper of a conjugate spinning machine and from the other hopper, nylon-6 chips of a molecular weight 17,500, the former was molten at 280° C. and the latter, at 275° C., and the melts were spun into a side-by-side type conjugated yarn at the conjugation ratio of 50:50 by means of a conjugate spinneret. During the operation no melt adhesion among the as-spun filaments as observed in conjugate spinning of random copolymer of nylon-6 and nylon-66 took place, but both the spinning and drawing were well operable. The as-spun filaments were drawn by 4.0× by means of a hot plate of 130° C. The properties of thus obtained drawn conjugated yarn are shown in Table 14, and those of the crimped yarn prepared by treating the above yarn in boiling water to impart crimp thereto, in Table 15.

Also for comparison, the case of replacing the block polyesteramide as one of the conjugate components by a random copolymer of nylon-6 and nylon-66 having a molecular weight of 19,300 is concurrently given.

TABLE 12

| | Tenacity, g./d. | Elongation, percent | Initial modulus, g./d. | Set[1] value, percent |
|---|---|---|---|---|
| Filament of the invention | 6.3 | 15.0 | 82.3 | 0.98 |
| Polycapramide filament | 8.1 | 23.5 | 38.9 | 1.88 |
| Polyethylene terephthalate filament | 6.4 | 20.3 | 120.7 | 0.90 |

[1] Set value = value measured in the manner described in Brit. 918,637. It is said that the less this value, the less the appearance of flat spotting when the polymer is used as a tire cord.

TABLE 14

| Conjugation system | Ratio of components | Tenacity, g./d. | Elongation, percent | Initial modulus, g./d. |
|---|---|---|---|---|
| Nylon-6: block polyesteramide | 50:50 | 5.3 | 38.0 | 48.6 |
| Nylon-6: nylon-6/nylon-66 copolymer | 50:50 | 4.8 | 29.1 | 23.1 |

TABLE 15

| Conjugation system | Ratio of components | Tenacity, g./d. | Elongation, percent | Crimp[1] recovery, percent | Number of[2] convolution/ 25 mm. |
|---|---|---|---|---|---|
| Nylon-6: block polyesteramide | 50:50 | 4.2 | 59.8 | 80.1 | 23 |
| Nylon-6: nylon-6/nylon-66 copolymer | 50:50 | 3.7 | 62.7 | 78.4 | 26 |

[1] Crimp recovery: $\dfrac{L_1 - L_2}{L_1 - L_0} \times 100\%$.

$L_0$ = length of crimped yarn (cm.).
$L_1$ = length of the yarn when stretched until all the crimps vanished.
$L_2$ = length of the yarn 1 minute after the tension stretching the yarn until the crimps vanished was freed.

[2] Number of convolution: number of convolutions in the crimped yarn over 25 mm. of the drawn yarn.

The block polyesteramide herein used was the polymer chips prepared by shaping the polymerization product from 20 parts of a polycapramide (molecular weight: 4,200) of which 98% of the end groups was amino group and 50 parts of a polyethylene terephthalate (molecular weight: 10,700) polymerized in the manner described in Example 7.

EXAMPLE 13

Sixty-five (65) parts of a polycapramide (molecular weight: 13,000) of which 98% of the end groups was amino group, 5 parts of a polystyrene (molecular weight: about 50,000) and 30 parts of a polyethylene terephthalate (molecular weight: 5,000) were melt-blended by means of an extruder, and the resultant blend was formed into chips, which were subsequently heated at 200° C. for 12 hours under a reduced pressure of 1–3 mm. Hg to effect the solid phase polymerization of the components. The product was melt-spun and the as-spun filaments were drawn by 4.0× at 140° C. The properties of the drawn filaments are given in Table 16.

TABLE 16

| | Tenacity, g./d. | Elongation, percent | Initial modulus, g./d. | C.R.[1] value |
|---|---|---|---|---|
| Filament of the invention | 4.3 | 29.3 | 70.2 | 0.67 |
| Polycapramide filament | 8.1 | 23.5 | 38.9 | 0.01 |

[1] Measured in the similar manner as described in Example 9.

What is claimed is:

1. A process for the preparation of block copolymers of polyamides and polyesters wherein said polyamides and polyesters are present in a mixture of 30 to 70% by weight of said polyamides and 70 to 30% by weight of said polyesters, which process comprises heating for a period of at least about three hours a solid mixture composed of at least one polyamide and at least one polyester to a temperature above 150° C. within the range above the second order transition point of the mixture component having the highest second order transition point and below the melting point of the mixture component having the lowest melting point, and thereby reacting the polyamide and the polyester at substantially solid phase to thereby obtain a block copolymer having a relative viscosity as measured in sulfuric acid at a concentration of 1.0 gram/100 cc. of sulfuric acid at 25° C. that remains substantially unchanged from that of a melt of the initial solid mixture.

2. The process of claim 1 wherein the solid phase reaction is performed under a reduced pressure.

3. The process of claim 1 wherein the solid phase reaction is performed at atmospheric pressure in an inert gas stream.

4. The process of claim 1 wherein the solid mixture is a melt-blended intimate solid mixture in which the polyamide and the polyester are uniformly dispersed and present as each independent phases.

5. The process of claim 1 wherein the solid mixture is that obtained by kneading the polyamide and the polyester at softened state.

6. The process of claim 1 wherein the solid mixture is that obtained by dissolving the polyamide and the polyester in a solvent and then distilling off that solvent from the resultant solution.

7. The process of claim 1 wherein the solid mixture is that obtained by dissolving the polyamide and the polyester in a solvent, pouring the resultant solution into a liquid which dissolves neither of the polymers and recovering the precipitate formed.

8. The process of claim 1 wherein the solid mixture is that obtained, using a solvent which can dissolve either the polyamide or the polyester, by the steps of dissolving the soluble component in the solvent and dispersing the other, mixing the system and distilling off the solvent from the dispersion.

9. The process of claim 1 wherein the solid mixture is that obtained, using a solvent which can dissolve either the polyamide or the polyester, by the steps of dissolving the soluble component in the solvent and dispersing the other, mixing the system, pouring the resultant dispersion in a liquid which dissolves neither of the polyamide nor the polyester and recovering the precipitate formed.

10. The process of claim 1 wherein the solid mixture is powdery polyamide and powdery polyester.

11. The process of claim 1 wherein the solid mixture is chip-, pellet- or flake-formed polyamide and polyester.

12. The process of claim 1 wherein the polyamide has a molecular weight ranging 1,000–30,000.

13. The process of claim 1 wherein the polyester has a molecular weight ranging 2,000–30,000.

14. The process of claim 1 wherein the polyester has a molecular weight of the range having no fiber-forming ability.

15. The process of claim 1 wherein the polyamide has a molecular weight of the range having no fiber-forming ability.

16. The process of claim 1 wherein no less than 50% of the total end groups of the polyamide is amino group.

17. The process of claim 1 wherein the solid mixture is that of a polyamide of which no less than 50% of the total end groups is carboxyl group and a polyester of which no less than 50% of the total end groups is hydroxyl group.

18. The process of claim 1 wherein the dicarboxylic acid component of the polyester is terephthalic acid.

19. The process of claim 1 wherein the solid mixture is that obtained by melt-blending of polycapramide and polyethylene terephthalate at a temperature within the range of 260–320° C. within 20 minutes so as to insure substantially no block copolymer formation until heating in substantially solid phase.

20. The process of claim 1 wherein the solid mixture is that obtained by melt-blending of polyhexamethylene adipamide and polyethylene terephthalate at a temperature within the range of 260–320° C. within 20 minutes so as to insure substantially no block copolymer formation until heating in substantially solid phase.

21. A process for the preparation of a block copolymer of polyamide and polyester wherein said polyamide and polyester are present in a mixture of 30 to 70% by weight of said polyamides and 70 to 30% by weight of said polyesters which comprises melt-blending polycapramide and polyethylene terephthalate at a temperature within the range of 260–320° C. within 20 minutes so as to insure substantially no block copolymer formation, and heating the resultant solid mixture for a period of at least about three hours to a temperature within the range of 150° C. to below the melting point of the polycapramide to effect the solid phase reaction of the polycapramide with the polyethylene terephthalate to thereby obtain a block copolymer having a relative viscosity as measured in sulfuric acid at a concentration of 1.0 gram/100 cc. of sulfuric acid at 25° C. that remains substantially unchanged from that of a melt of the initial solid mixture.

22. A process for the preparation of a block copolymer of polyamide and polyester wherein said polyamide and polyester are present in a mixture of 30 to 70% by weight of said polyamides and 70 to 30% by weight of said polyesters which comprises melt-blending polyhexamethylene adipamide and polyethylene terephthalate at a temperature within the range of 260–320° C. within 20 minutes so as to insure substantially no block copolymer formation, and heating the resultant solid mixture for a period of at least about three hours to a temperature within the range of 150° C. to below the melting point of polyhexamethylene adipamide to effect the solid phase reaction of the polyhexamethylene adipamide and the polyethylene terephthalate to thereby obtain a block copolymer having a relative viscosity as measured in sulfuric acid at a concentration of 1.0 gram/100 cc. of sulfuric acid at 25° C. that remains substantially unchanged from that of a melt of the initial solid mixture.

23. A process for the preparation of filaments which comprises melt-spinning a block copolymer of polyamide and polyester wherein said polyamide and polyester are present in a mixture of 30 to 70% by weight of said polyamides and 70 to 30% by weight of said polyesters obtained by substantially solid phase reaction effected by heating for a period of at least about three hours of a solid mixture composed of at least one polyamide and at least one polyester to a temperature above 150° C. within the range above the second order transition point of the mixture component having the highest second order transition point and below the melting point of the mixture component having the lowest melting point to thereby obtain a block copolymer having a relative viscosity as measured in sulfuric acid at a concentration 1.0 gram/100 cc. of sulfuric acid at 25° C. that remains substantially unchanged from that of a melt of the initial solid mixture.

24. A process for the preparation of filaments which comprises melt-spinning a blend of a block copolymer of polyamide and polyester wherein said polyamide and polyester are present in a mixture of 30 to 70% by weight of said polyamides and 70 to 30% by weight of said polyesters with at least one other polymer, said block copolymer being that obtained by substantially solid phase reaction effected by heating for a period of at least about three hours of a solid mixture composed of at least one polyamide and at least one polyester to a temperature above 150° C. within the range above the second order transition point of the mixture component having the highest second order transition point and below the melting point of the mixture component having the lowest melting point to thereby obtain a block copolymer having a relative viscosity as measured in sulfuric acid at a concentration of 1.0 gram/100 cc. of sulfuric acid at 25° C. that remains substantially unchanged from that of a melt of the initial solid mixture.

25. A process for the preparation of composite yarn which comprises conjugate spinning a block copolymer of polyamide and polyester wherein said polyamide and polyester are present in a mixture of 30 to 70% by weight of said polyamides and 70 to 30% by weight of said polyesters together with at least one other polymer in molten state, said block copolymer being that obtained by substantially solid phase reaction effected by heating for a period of at least about three hours of a solid mixture composed of at least one polyamide and at least one polyester to a temperature above 150° C. within the range above the second order transition point of the mixture component having the highest second order transition point, and below the melting point of the mixture component having the lowest melting point to thereby obtain a block copolymer having a relative viscosity as measured in sulfuric acid at a concentration of 1.0 gram/100 cc. of sulfuric acid at 25° C. that remains substantially unchanged from that of a melt of the initial solid mixture.

26. A process for the preparation of block copolymers of polyamides and polyesters by heating a mixture of polyamide and polyester, which comprises heating a solid mixture composed of 30 to 70% by weight of at least one polyamide selected from the group consisting of polycapramide and polyhexamethylene adipamide and 70 to 30% by weight of at least one polyester selected from the group consisting of polyethylene terephthalate and copolyesters containing polyethylene terephthalate as main component, for a period of at least about three hours at a temperature above 150° C. within the range above the second order transition point of said solid mixture component having the highest second order transition point and below the melting point of said solid mixture component having the lowest melting point to thereby react said polyamide and said polyester at substantially solid phase, and thereby obtain a block copolymer having a relative viscosity as measured in sulfuric acid at a concentration of 1.0 gram/100 cc. of sulfuric acid at 25° C. that remains substantially unchanged from that of a melt of the initial solid mixture.

(References on following page)

References Cited

UNITED STATES PATENTS

| | | | |
|---|---|---|---|
| 3,369,057 | 2/1968 | Twilley | 260—857 |
| 3,378,055 | 4/1968 | Robertson | 260—857 |
| 3,378,056 | 4/1968 | Robertson | 260—857 |
| 3,378,602 | 4/1968 | Robertson | 260—857 |
| 3,382,305 | 5/1968 | Breen | 260—857 |

FOREIGN PATENTS 132,546  4/1949  Australia.

MURRAY TILLMAN, Primary Examiner

PAUL LIEBERMAN, Assistant Examiner

U.S. Cl. X.R.

260—75, 78, 858